United States Patent
Al Kamand et al.

(10) Patent No.: US 12,411,290 B2
(45) Date of Patent: Sep. 9, 2025

(54) RETAINING ARRANGEMENT FOR AN OPTICAL ELEMENT

(71) Applicant: Toptica Photonics SE, Gräfelfing (DE)

(72) Inventors: Rami Al Kamand, Grünwald (DE); Markus Manhart, Munich (DE)

(73) Assignee: Toptica Photonics SE, Gräfelfing (DE)

( * ) Notice: Subject to any disclaimer, the term of this patent is extended or adjusted under 35 U.S.C. 154(b) by 50 days.

(21) Appl. No.: 18/102,097

(22) Filed: Jan. 27, 2023

(65) Prior Publication Data

US 2023/0273379 A1 Aug. 31, 2023

(30) Foreign Application Priority Data

Jan. 27, 2022 (DE) ................. 10 2022 101 921.7

(51) Int. Cl.
  *H04B 10/00* (2013.01)
  *G02B 6/42* (2006.01)

(52) U.S. Cl.
  CPC ......... *G02B 6/4214* (2013.01); *G02B 6/4226* (2013.01)

(58) Field of Classification Search
  CPC .... G02B 6/4214; G02B 6/4226; G02B 7/008; G02B 6/3628; G02B 6/32
  See application file for complete search history.

(56) References Cited

U.S. PATENT DOCUMENTS 5,354,158 A * 10/1994 Sheldon ................. B23Q 17/24
  409/145
5,413,167 A * 5/1995 Hara ....................... H01L 23/34
  250/443.1

(Continued)

FOREIGN PATENT DOCUMENTS

DE  10344178   4/2005
DE  60026891   8/2006

(Continued)

OTHER PUBLICATIONS

Prüfungsbericht [Examination Report] Dated Sep. 13, 2022 From the Deutsches Patent—und Markenamt [German Patent and Trademark Office] Re. Application No. 102022101921.7. (4 Pages).

*Primary Examiner* — Agustin Bello

(57) ABSTRACT

The disclosure relates to a retaining arrangement with a carrier platform (2), for example in laser systems, to which at least one optical element (3) is fixed. The disclosure specifies a retaining arrangement for optical elements which ensures improved beam position stability with as little effort as possible. For this purpose, the carrier platform (2) is connected to a base (8) at bearing points (5) via a respective elastically compliant and/or damping connecting structure (6). The connecting structure (6) is designed to elastically absorb thermal expansions of the carrier platform (2). The at least one optical element (3) is located at a neutral point (13) and/or on a neutral axis on the carrier platform (2), wherein this neutral point (13) or the neutral axis is positionally stable relative to the base (8) during thermal deformation of the carrier platform (2). The carrier platform (2) is connected to a heat sink or source (16) via an intermediate heat pump, for example in the form of a Peltier element (17), with a flexible, for example ribbon-shaped heat transfer element (15) without mechanical retroaction.

11 Claims, 2 Drawing Sheets

(56) References Cited

U.S. PATENT DOCUMENTS

| | | | | |
|---|---|---|---|---|
| 6,330,837 B1* | 12/2001 | Charles | | B25J 17/0266 |
| | | | | 901/29 |
| 6,477,912 B2* | 11/2002 | Song | | F16H 21/46 |
| | | | | 901/29 |
| 6,769,194 B2* | 8/2004 | Hennessey | | B25J 17/0216 |
| | | | | 33/645 |
| 7,242,537 B2* | 7/2007 | Weber | | G03F 7/70833 |
| | | | | 359/223.1 |
| 8,215,199 B2* | 7/2012 | Marcroft | | B25J 17/0216 |
| | | | | 74/490.13 |
| 9,068,622 B2* | 6/2015 | Malchev | | F16F 9/53 |
| 9,109,743 B2* | 8/2015 | Schwab | | F16H 21/46 |
| 9,348,197 B2* | 5/2016 | Lewis | | F16M 11/123 |
| 9,694,455 B2* | 7/2017 | Brown | | B23Q 1/4809 |
| 10,663,040 B2* | 5/2020 | Shu | | H02N 2/043 |
| 11,126,063 B2* | 9/2021 | Meissner | | G02F 1/3551 |
| 11,203,112 B2* | 12/2021 | Zhao | | F16C 7/02 |
| 11,269,143 B2* | 3/2022 | Wiley | | G02B 6/2555 |
| 11,681,100 B2* | 6/2023 | Wiley | | F16M 11/12 |
| | | | | 385/97 |
| 11,971,578 B2* | 4/2024 | Wiley | | F16M 11/12 |
| 12,030,176 B2* | 7/2024 | Granstrand | | B25J 9/0033 |
| 2001/0039126 A1* | 11/2001 | Ebinuma | | G02B 7/028 |
| | | | | 438/795 |
| 2004/0105177 A1* | 6/2004 | Ebinuma | | G03F 7/70891 |
| | | | | 359/871 |
| 2006/0007563 A1* | 1/2006 | Weber | | G03F 7/709 |
| | | | | 359/819 |
| 2009/0153949 A1* | 6/2009 | Kanemoto | | H04B 10/40 |
| | | | | 228/178 |
| 2010/0001616 A1* | 1/2010 | Ferreira | | H02N 1/008 |
| | | | | 310/300 |
| 2011/0019171 A1* | 1/2011 | Schubert | | G03F 7/70825 |
| | | | | 359/896 |
| 2013/0182344 A1* | 7/2013 | Pnini-Mittler | | G02B 7/1824 |
| | | | | 359/871 |
| 2014/0150593 A1* | 6/2014 | Brown | | B25J 9/0045 |
| | | | | 901/19 |
| 2015/0239082 A1* | 8/2015 | Krouglicof | | F16C 11/0623 |
| | | | | 248/346.01 |
| 2018/0095223 A1* | 4/2018 | Wiley | | G02B 6/2555 |
| 2018/0196253 A1* | 7/2018 | Kwan | | G02B 26/0825 |
| 2019/0094705 A1* | 3/2019 | Kugler | | G02B 7/182 |
| 2021/0141284 A1* | 5/2021 | Meissner | | G02F 1/3551 |
| 2021/0405542 A1* | 12/2021 | Nefzi | | G03F 7/70258 |
| 2024/0159988 A1* | 5/2024 | Rabe | | G03F 7/702 |
| 2024/0255096 A1* | 8/2024 | Dutta | | F16M 11/2042 |
| 2024/0269788 A1* | 8/2024 | Schulz | | B23Q 17/003 |

FOREIGN PATENT DOCUMENTS

| | | |
|---|---|---|
| DE | 102010022934 | 12/2011 |
| DE | 102018200956 | 12/2018 |

* cited by examiner

RETAINING ARRANGEMENT FOR AN OPTICAL ELEMENT

FIELD AND BACKGROUND OF THE INVENTION

The present disclosure relates to a retaining arrangement with a carrier platform to which at least one optical element is fixed.

In optical systems, mounting concepts are required for the optical elements used (e.g. lenses, filters, prisms, etc.). In laser systems, there is often a requirement to fix optical subsystems to a base (screw-on surface) of the laser system, whereby an optical axis of the respective subsystem should be as positionally stable as possible relative to the base.

For example, the direction of the output beam from a laser system is subject to certain variations that can cause significant problems, such as when the beam must be coupled into a light-conducting fiber or out of a light-conducting fiber and/or when the beam must accurately strike a target at a greater distance.

Occurring beam direction fluctuations can have various causes. If the laser beam propagates through an optical subsystem connected to the laser system, this generally has an influence on the beam guidance, whereby this influence strongly depends on how positionally stable the optical elements of the subsystem are relative to the base. For example, if laser radiation emerges from one end of an optical fiber in a coupling unit attached to the laser system and is collimated by a lens, the position of the laser beam downstream of the lens will exhibit undesirable transverse motion corresponding to occurring angular variations of the lens. It is desirable to have a design in which the fluctuations in the angular orientation of the laser beam are only a small fraction of the beam divergence.

It is known to minimize beam position fluctuations by minimizing mechanical vibrations of the relevant optical elements through a stable design and mechanical decoupling. As a further measure to avoid beam position fluctuations, it is known to minimize thermal drifts by shielding heated components such as laser diodes or electronic circuits from the optical elements influencing the beam position for example.

In practice, the known approaches often prove to be insufficient or too complex and thus too expensive for certain applications.

SUMMARY OF THE INVENTION

The present disclosure relates to a retaining arrangement of the type indicated at the outset in that the carrier platform is connected to a base at bearing points in each case via an elastically compliant and/or damping connecting structure, the connecting structure being designed to elastically absorb thermal expansions of the carrier platform, the at least one optical element being located at a neutral point on the carrier platform, this neutral point being characterized as such by the fact that it is positionally stable relative to the base in the event of thermal deformation of the carrier platform.

DESCRIPTION OF SPECIFIC EMBODIMENTS OF THE INVENTION

Figure 1A:
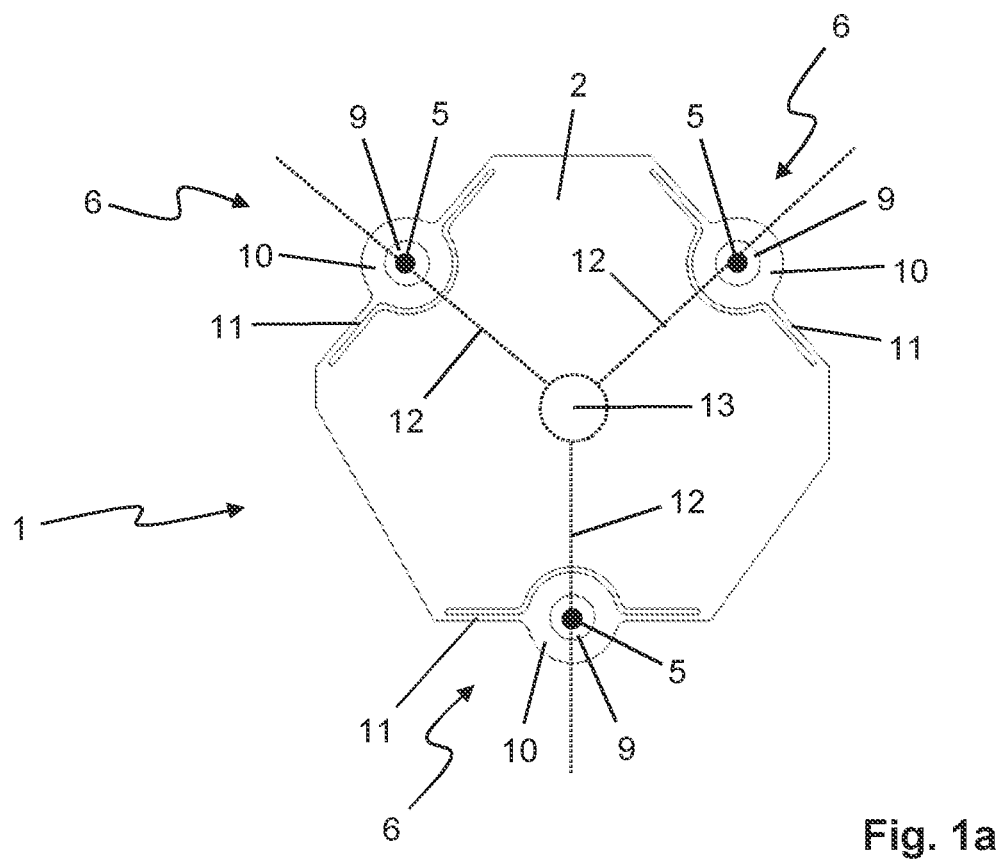
FIG. 1a,b: shows a schematic top view on a retaining arrangement from above.

The present disclosure relates to a retaining arrangement of the type indicated at the outset in that the carrier platform is connected to a base at bearing points in each case via an elastically compliant and/or damping connecting structure, the connecting structure being designed to elastically absorb thermal expansions of the carrier platform, the at least one optical element being located at a neutral point on the carrier platform, this neutral point being characterized as such by the fact that it is positionally stable relative to the base in the event of thermal deformation of the carrier platform. The carrier platform is connected to a heat sink or source via an intermediate heat pump, for example in the form of a Peltier element, with a flexible, for example ribbon-shaped heat transfer element.

The base represents the reference structure for the retainer, as it were. Via the base, for example, the optical subsystem arranged on the carrier platform can be connected to a laser system. Likewise, the base can, for example, be part of a housing or a base frame of a laser system or another optical system.

The disclosure is based on providing mechanical decoupling via the elastically compliant and/or damping connection structure, so that influences of mechanical fluctuations on the optical elements fixed on the carrier platform are minimized. At the same time, thermal influences are minimized by positioning the at least one optical element relevant for the beam position at the neutral point and/or on the neutral axis on the carrier platform. The neutral point is defined by the fact that it remains positionally stable relative to the base in the event of thermal deformation of the carrier platform, e.g. due to thermal expansion in the event of temperature fluctuations.

In one possible embodiment, the carrier platform forms an optical bench, wherein an optical axis defined by the at least one optical element fixed on the carrier platform (2) passes through the neutral point. In this way, the desired beam stability can be achieved.

The bearing points are conveniently positioned in a statically suitable arrangement for the retaining task. In one embodiment, for example, the bearing points can be arranged spaced apart from one another on the outer circumference of the carrier platform. In principle, however, any arrangement of the bearing points on the carrier platform is conceivable. The number of bearing points can also vary. The support via the bearing points serves to ensure that no undesirable tilting movements are possible. For example, three (or more) bearing points can be provided, which do not all lie on a common axis.

In the case of thermal deformations, an elastic displacement occurs in the compliant connection structures. With the most diverse conceivable geometries of the carrier platform with the most diverse arrangements of the bearing points on the carrier platform, a neutral point or a neutral axis can be found which always remains positionally stable under thermal deformations. According to the disclosure, the optical element critical for the beam position is arranged there.

In other words, the arrangement of the bearing points compensates for quasi-static movements due to changes in the isotropic ambient temperature field by absorbing these movements through the elastic compliance of the connecting structure. This compliance allows a "sacrificial movement"

to be performed, so to speak, which ensures that the optical element located at the neutral point remains positionally stable and that the beam position accordingly does not change (i.e. only within tolerable limits) despite temperature fluctuations occurring.

The approach to beam position stabilization according to the disclosure can be further supported by selecting as material for the carrier platform a material with thermally/mechanically invariant behavior as far as possible, i.e. a material or material composition with thermal expansion as low as possible.

The carrier platform is connected to a heat sink or source via a flexible, for example ribbon-shaped heat transfer element. In some applications, there is a requirement to temper the optical elements located on the carrier platform, i.e., to bring them to a certain operating temperature and keep them there. According to the disclosure, the heat conduction path required for this purpose is formed by the flexible heat transfer element, for example in the form of a flexible ribbon of metal mesh. The flexibility of the heat transfer element provides that the thermal connection to the heat sink or heat source is mechanically without retroaction, meaning that the mechanical decoupling provided by the connection structure is not impaired by the thermal connection. In addition, the flexible heat transfer element offers the possibility that the heat sink or source connected above it can be positioned freely, for example also at a greater distance from the carrier platform. When designing the heat transfer element, care should be taken to ensure that the connection to the carrier platform covers an area as large as possible. Temperature control can be achieved by specifying the heat flow via the heat transfer element.

The carrier platform is connected to the flexible heat transfer element via an intermediate heat pump, for example in the form of a Peltier element. Temperature control can be realized by suitable control of the Peltier element, ideally in combination with temperature measurement on the carrier platform. The Peltier element thereby controls the heat flow from the heat source to the carrier platform or from the carrier platform to the heat sink. Thus, the carrier platform and the optical elements arranged thereon can be kept stable at a predetermined temperature. In one possible embodiment, the connecting structure includes thermal insulation provided to reduce or substantially eliminate heat flow between the carrier platform and the base. Through the thermal insulation thermal influences on the carrier platform and the optical elements located thereon are minimized.

In one practical embodiment, the connecting structure may comprise a connecting member connected to the base and connected to the carrier platform via an elastic solid joint. An elastic solid joint, for example in the form of a plate joint, offers the possibility that the displacement motion of the connecting member relative to the carrier platform is well defined. For example, a plate joint can be designed to be compliant along only one axis. By combining such joints at the various bearing points with specific alignment of the respective displacement axes, the position of the neutral point or neutral axis on the carrier platform can be specifically specified to meet the requirements.

In a simple realization, the connecting member can be a bolt screwed to the base and guided in a sleeve (e.g. threaded sleeve) connected to the carrier platform via the elastic solid joint. Due to the reduced material cross-sections in the area of the joint, the solid joint also offers the possibility that it intrinsically reduces the heat flow from the base to the carrier platform via the connecting structure (thermal insulation).

The solid joint can also be designed to provide sufficient damping for the desired mechanical decoupling.

In one possible embodiment, the at least one optical element is an element from the list: Lens, optical grating, prism, beam splitter, filter, end of an optical fiber, laser diode, or a combination of these elements, to name just a few exemplary possibilities.

In an application, an end of a light conducting fiber and a lens are fixed to the carrier platform, with the lens located at the neutral point. In this case, the retaining arrangement holds the components of a fiber coupler for coupling light out of the fiber or coupling light into the fiber. The beam position stabilization achieved according to the disclosure can ensure efficient and stable outcoupling or incoupling.

In the following figure description, the same reference signs and the same terms are used for the same elements.

Figure 1B:
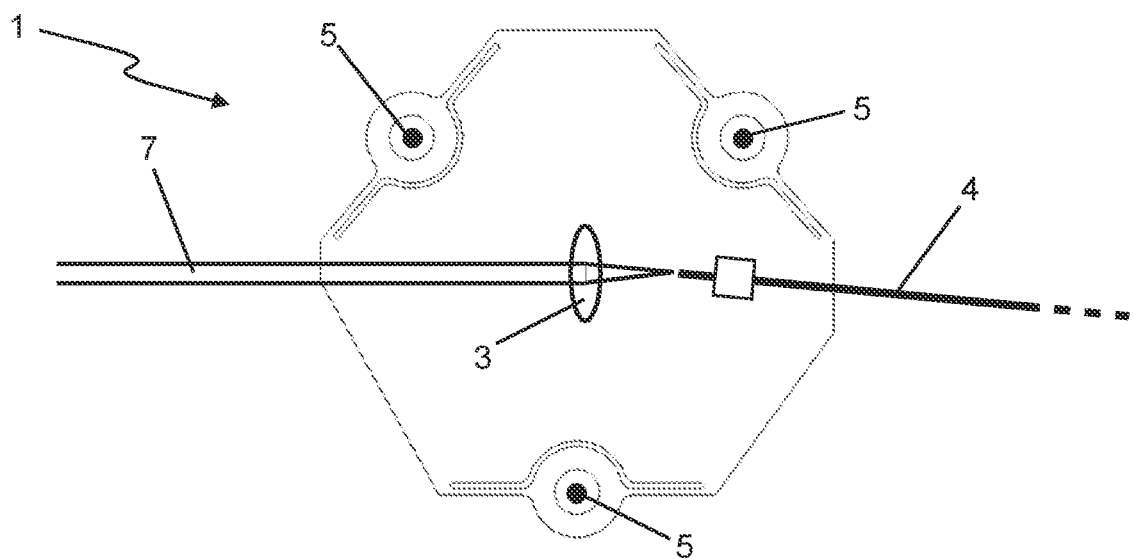

In the figures, the retaining arrangement as a whole is designated by the reference numeral 1. It has a carrier platform 2 in the form of a polygonally shaped block in plan view (FIG. 1). A focusing lens 3 and one end 4 of a light-conducting fiber are fixed to the carrier platform 2 as optical elements. The focusing lens 3 focuses a laser beam 7 coming from the left in the drawings onto the fiber end 4 to couple the radiation into the light-conducting fiber. The carrier platform 2 is connected to a base 8 (FIG. 2) at three bearing points 5 distributed over the outer circumference of the carrier platform 2 in a triangular configuration, each via an elastically compliant and damping connection structure 6.

The connecting structures 6 each comprise a connecting member connected to the base 8 in the form of a screw bolt 9 (FIG. 2), which is screwed into the base 8. The screw bolt 9 is guided in each case in a sleeve 10, which is connected to the carrier platform 2 via a solid joint 11 designed as a plate joint. The plate joints each define a deflection axis 12. By combination of the joints 11 at the three bearing points 5 with the illustrated alignment of the deflection axes 12 the position of an excellent point 13 on the carrier platform 2 (FIG. 1) is specified. When thermal expansion occurs due to temperature fluctuations, elastic displacement occurs along the axes 12. The thermal expansion is thereby absorbed by the solid joints 11. In the geometry shown, the excellent point 13 results as a neutral point which always remains positionally stable in relation to the base 8 during thermal deformations. Accordingly, the lens 3 is arranged in the point 13 so that the position of the lens 3 and thus the focus of the laser beam 7 on the fiber end 4 remains unchanged stable during temperature fluctuations.

With the geometry of the bearing points 5 in combination with the three solid joints 11, the neutral point 13 results, as explained. In the case of a deviating geometry, in which, for example, the deflection axes 12 do not intersect at a point but run parallel to each other, a neutral axis (not shown) can alternatively be realized.

The connection structure 6 comprises thermal insulation in the form of spacer sleeves 14 made of thermally insulating material, which are provided to minimize heat flow between the carrier platform 2 and the base 8.

Figure 2:
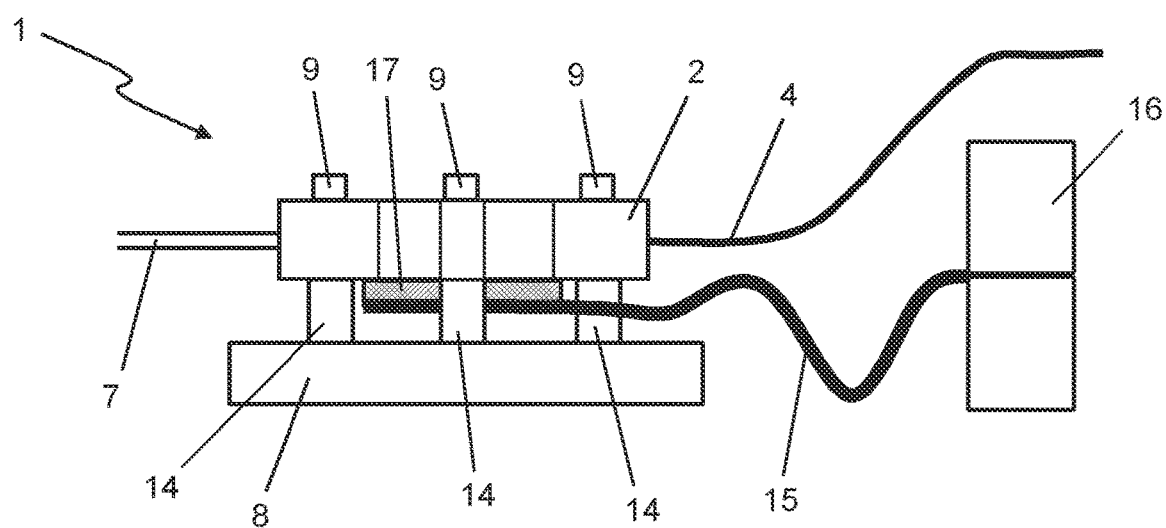
FIG. 2: shows a schematic side view on the retaining arrangement of FIG. 1.

As can be seen in FIG. 2, the carrier platform 2 is connected to the base 8 only via the screw bolts 9 of the connecting structure 6 with the spacer sleeves 14 arranged between them. Otherwise, there is no material contact between the carrier platform 2 and the base 8.

The carrier platform 2 is connected to a heat sink or source 16 via a flexible, ribbon-shaped heat transfer element 15 (FIG. 2). A heat conduction path is formed by the flexible heat transfer element 15 in order to be able to selectively temper the carrier platform 2 with the optical element 3 arranged thereon. Due to the flexibility of the heat transfer element 15, the thermal connection to the heat sink or source 16 is mechanically without retroaction. The mechanical decoupling provided by the compliant connection structure 6 is thus not impaired by the thermal connection. The carrier platform 2 is connected to the flexible heat transfer element 15 via an intermediate Peltier element 17. By controlling the Peltier element, temperature control or regulation can be implemented. The Peltier element 17 controls the heat flow from the heat source 16 to the carrier platform 2 or from the carrier platform 2 to the heat sink 16.

The disclosure specifies a retaining arrangement for optical elements that ensures improved beam position stability with as little effort as possible.

The invention claimed is:

1. A retaining arrangement having a carrier platform to which at least one optical element is fixed, wherein the carrier platform is connected to a base at bearing points via a respective elastically compliant and/or damping connecting structure, wherein the connecting structure is designed to elastically absorb thermal expansions of the carrier platform, wherein the at least one optical element is located at a neutral point and/or on a neutral axis on the carrier platform, wherein this neutral point and/or neutral axis is positionally stable relative to the base during thermal deformation of the carrier platform, wherein the carrier platform is connected to a heat sink or source via an intermediate heat pump with a flexible heat transfer element that provides a thermal connection without mechanical retroaction, thereby maintaining the mechanical decoupling provided by the connecting structure.

2. The retaining arrangement according to claim 1, wherein the bearing points are arranged at a distance from each other on the carrier platform.

3. The retaining arrangement according to claim 1, wherein the connection structure comprises a thermal insulation provided to reduce a heat flow between the carrier platform and the base.

4. The retaining arrangement according to claim 1, wherein the connecting structure comprises a connecting member (9) connected to the base, which is connected to the carrier platform via an elastic solid joint.

5. The retaining arrangement according to claim 4, wherein the connecting member is a bolt screwed to the base, which is guided in a sleeve, which is connected to the carrier platform via the elastic solid joint.

6. The retaining arrangement according to claim 1, wherein the carrier platform forms an optical bench, wherein an optical axis defined by the at least one optical element fixed on the carrier platform passes through the neutral point.

7. The retaining arrangement according to claim 1, wherein the at least one optical element is an element selected from the list: Lens, optical grating, prism, beam splitter, filter, end of a light conducting fiber, laser diode.

8. The retaining arrangement according to claim 1, wherein an end of a light conducting fiber and a lens are fixed to the carrier platform, wherein the lens is located at the neutral point.

9. A laser system comprising a retaining arrangement according to claim 1, wherein at least one optical element of the laser system is fixed to the retaining arrangement.

10. The retaining arrangement according to claim 1, wherein the intermediate heat pump is a Peltier element.

11. The retaining arrangement according to claim 1, wherein the flexible heat transfer element is a ribbon-shaped element.

* * * * *